Figure 7:
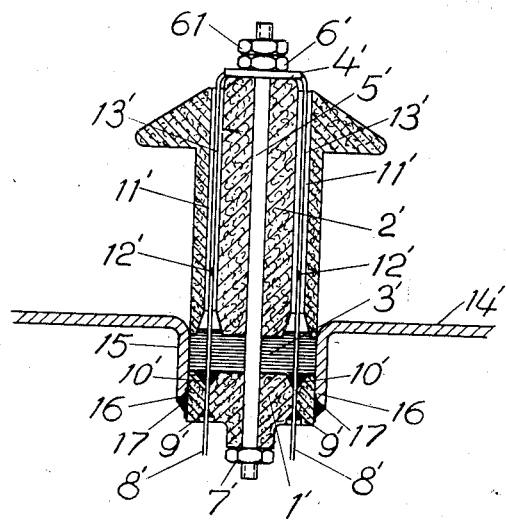

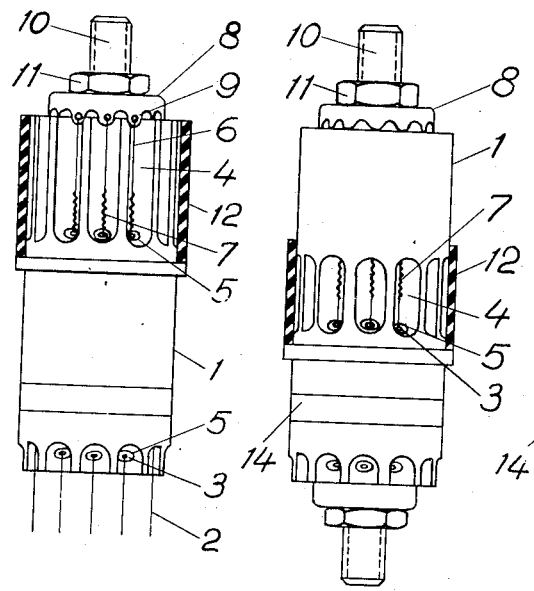

June 17, 1947.  B. HANSSON ET AL  2,422,546
LEADING-THROUGH INSULATOR
Filed Jan. 23, 1945   2 Sheets-Sheet 2

INVENTORS
Bror Hansson & Ture Ljungberg
BY
Wm. Wallace White & Sertti
Attorneys

Patented June 17, 1947

2,422,546

UNITED STATES PATENT OFFICE 2,422,546

LEADING-THROUGH INSULATOR

Bror Hansson, Stockholm, and Ture Ljungberg, Alvsjo, Sweden, assignors to Allmanna Svenska Elektriska Aktiebolaget, Vasteras, Sweden, a Swedish corporation Application January 23, 1945, Serial No. 574,088
In Sweden October 29, 1943

4 Claims. (Cl. 174—145)

Low voltage condensers must be made with very thin insulation between the foils. Generally this insulation consists of only two or three thin papers. As paper, even of the highest quality seldom is completely faultless all over its surface, it can not be certain that it has the same high dielectric strength everywhere in the thin insulation. On that account the condenser is divided up into a large number of small elements, inserted into the same case filled with oil or other insulating fluid. Generally each element is provided with a fuse, the purpose of which is to disconnect elements which are destroyed in a test or in service. If testing is made with an open condenser case the insulating fluid is subjected to the detrimental influence of the air during the testing period. If instead of this a condenser with element fuses is tested after the case is closed, there is the risk of the insulating fluid being destroyed by the arc, when the fuse melts.

The present invention has for its object to avoid this disadvantage by an improved design of the leading-through insulator, enabling the disconnection of faulty elements during testing as also in service without impairing the insulation of the condenser. This new type of leading-through insulator has the following characteristic features: It is provided with several conductors which are soldered or fixed by vitrescence to the ceramic insulator body and the parts of the conductors situated on the surface of the insulator body are well insulated from each other and detachable from a common connecting arrangement on the insulator.

The attached drawings show three different forms of arrangement in Figs. 1-6 in side elevation and plan, and a fourth form of arrangement is shown in longitudinal section in Fig. 7.

In Figs. 1 and 2, 1 indicates the porcelain insulator body, which is provided with several leading-through leads 2, each one intended to be connected to a condenser element or condenser section inside the condenser case. The leads are placed partly in axial holes 3, partly in axial grooves 4 on the outer side of the insulator. All the leading-through leads are thus electrically insulated from each other in a reliable manner. At the upper orifice of the hole and possibly also at the lower one the lead is soldered or fixed by vitrescence to the porcelain. When soldering is used the porcelain is preferably metallized. By soldering the lead to this metallization, which is marked 5, the leading-through of the lead will be completely oil tight. In the free part of the lead placed in the groove, a fuse 6 is inserted. This may of course be secured by means of screws, but the drawing shows an arrangement in which the fuse wire 6 is joined at 7 to the conductor wire 2 by soldering. At the other end the fuse wire 6 is soldered to the top washer 8, which is for this purpose provided with bored flaps, projecting into the grooves 4. The soldering of the many joints in this insulator is suitably effected by dipping the previously mounted porcelain in soldering tin, when all mechanical connections are made. The top washer is soldered to connection bolt 10, which is provided with the connecting nut 11. The grooves 4 are surrounded by a protecting ring 12 of ceramic or other material, for instance a formaldehyde phenolic condensation product. Thereafter the grooves 4 may be filled with sand or other arc extinguishing means in the same manner as with ordinary fuses. The annular metallization 14, surrounding the insulator, is used for tightly soldering the porcelain into the case.

The main features of the embodiments shown in Figs. 3-6 are the same as in Figs. 1 and 2.

In Figs. 3 and 4 the bolt 10 is a leading-through bolt secured to the porcelain body. The fuse wires lie protected in axial holes 13. Only the joints 7 are accessible in the grooves 4.

Figs. 5 and 6 show an arrangement in which the holes 3 open into the grooves 4 at different heights on the outer side of the insulator. Hereby a larger creeping distance between the metallized spots 5 is obtained. This arrangement is made upwards as well as downwards on the insulator. Downwards every other hole is on the under side of the insulator, whereas the orifice of intermediary holes are situated in a groove a short distance upwards on the outer side of the insulator.

In Fig. 7 the leading-through body of porcelain consists of two parts 1' and 2', which are together with the intermediary packing 3' and the top washer 4' connected together by means of the leading-through bolt 5' and the nuts 6', 7'. The leads 8' pass through narrow holes in the lower part 1' of the leading-through insulator. At the leading in orifice 9' and the leading out orifice 10' of the insulator the leads are soldered or fixed by vitrescence to the porcelain so that the hole in the porcelain body is hermetically closed. The leads 8' then pass through holes in the rubber packing 3' and thereafter pass into the wider holes 11' in the upper part 2' of the insulator. Here each lead is at 12' joined to a fuse wire 13', which at its upper part is fixed to the top washer 4′, which may for this purpose be provided with pierced flaps projecting into the holes 11′ as is described in the previous forms of invention. The top washer serves as a common connecting arrangement for the leading-through leads. The connection to the supply lead is effected by means of the nut 61.

The drawing shows the leading-through insulator, placed in the sheet iron wall 14′ of a condenser case. The hole of the insulator in the sheet iron wall is provided with downwardly bent edges 15, which are soldered at 16 to the metallized ribbon 17 surrounding the insulator part 1′.

As already mentioned the invention has the advantage that a faulty element easily may be disconnected. During service, therefore, the case need not be opened, and the risk of impairment of the insulating fluid is thus avoided.

If the leading-through insulator is not provided with fuses and a break-down has occurred in a condenser element, its leading-through lead may be cut on the outside of the insulator. If the insulator is provided with fuses the faulty element is automatically disconnected, when the fuse melts.

Another very great advantage with this leading-through insulator is that fuse wires can be repaired, when unintentionally destroyed, for instance on account of too large discharge current, when the condenser is tested with roughly sixfold D. C. voltage. Thanks to this possibility of repairing, the fuses may be dimensioned much weaker than hitherto and constitute thus a better short circuit and overload protection than the present fuses have been.

The leading-through insulator described above is intended for use with condensers, but as a matter of fact it need not be bound exclusively to such apparatus. It is as useful with other electrical apparatus, which need an insulator with several leading-through leads, with or without fuses.

We claim as our invention:

1. A leading-through insulator for electrical apparatus comprising a ceramic body, orifices in the body, leading-through leads solidly fixed at the orifices, a fusible agent binding each lead to the ceramic body, said leads being well insulated from each other on the ceramic body outside the orifices, a common connecting arrangement mounted on the insulator and to which the said leads are fixed, and axial grooves in the ceramic body, each lead being laid in one of said grooves in the upper part of the insulator between an orifice and the connecting arrangement.

2. A leading-through insulator according to claim 1, comprising fuses inserted in the leads on the upper part of the insulator between the orifices and the connecting arrangement.

3. A leading-through insulator according to claim 1, comprising fuses inserted in the leads on the upper part of the insulator between the orifices and the connecting arrangement, and axial grooves on the upper part of the insulator accommodating the fuses.

4. A leading-through insulator according to claim 1, comprising grooves in the body to accommodate the leads, and a protecting ring of insulating material surrounding the grooves.

BROR HANSSON.
TURE LJUNGBERG.

REFERENCES CITED

The following references are of record in the file of this patent:

UNITED STATES PATENTS

| Number | Name | Date |
| --- | --- | --- |
| 2,106,394 | Mitchell | Jan. 25, 1938 |
| 2,066,856 | Rose, Jr. | Jan. 5, 1937 |
| 2,174,374 | Beggs | Sept. 26, 1939 |
| 1,075,573 | Johannesen | Oct. 14, 1913 |
| 2,263,416 | Douglas | Nov. 18, 1941 |
| 1,953,594 | Douglas | Apr. 3, 1934 |
| 1,706,987 | Schaffler | Mar. 26, 1929 |
| 1,016,780 | Rutzky | Feb. 6, 1912 |
| 2,137,069 | Vatter | Nov. 15, 1938 |
| 2,210,699 | Bahls | Aug. 6, 1940 |